(12) United States Patent
Lyons et al.

(10) Patent No.: US 6,225,891 B1
(45) Date of Patent: May 1, 2001

(54) WIDE-ANGLE, STATIC AND POSITIONAL ANTICIPATORY OBJECT DETECTION SYSTEM

(75) Inventors: Christopher T. Lyons, Tyngsboro; Ismail Taskin, Arlington, both of MA (US)

(73) Assignee: Hittite Microwave Corp., Chelmsford, MA (US)

( * ) Notice: Subject to any disclaimer, the term of this patent is extended or adjusted under 35 U.S.C. 154(b) by 0 days.

(21) Appl. No.: 09/478,841

(22) Filed: Jan. 7, 2000

(51) Int. Cl.[7] ..................................... B60Q 1/00
(52) U.S. Cl. .................. 340/435; 340/436; 340/903; 342/70
(58) Field of Search ..................... 340/435, 436, 340/901, 903, 904, 554, 437; 342/70, 71, 72, 104; 180/169, 271

(56) References Cited

U.S. PATENT DOCUMENTS

| | | | |
|---|---|---|---|
| 3,750,171 | 7/1973 | Faris | 342/112 |
| 3,832,709 | 8/1974 | Klein et al. | 342/127 |
| 3,860,923 | 1/1975 | Yamanaka et al. | 342/72 |
| 3,864,678 | 2/1975 | Yamanaka et al. | 342/59 |
| 3,893,114 | 7/1975 | Yamanaka et al. | 342/72 |
| 3,952,303 | 4/1976 | Watanabe et al. | 342/72 |
| 3,974,501 | 8/1976 | Ritzie | 342/71 |
| 4,003,049 | 1/1977 | Sterzer et al. | 342/70 |
| 4,008,473 | 2/1977 | Hinachi et al. | 342/84 |
| 4,158,841 | 6/1979 | Wiichner et al. | 342/71 |
| 4,573,017 | 2/1986 | Levine | 327/114 |
| 4,729,247 | 3/1988 | Brown | 73/866.4 |
| 4,816,781 | 3/1989 | Marz | 332/124 |
| 4,833,469 | * 5/1989 | David | 340/901 |
| 4,945,360 | 7/1990 | Trummer et al. | 342/122 |
| 5,287,111 | 2/1994 | Shpater | 342/28 |
| 5,339,081 | 8/1994 | Jefferis et al. | 342/28 |
| 5,402,129 | 3/1995 | Gellner et al. | 342/70 |
| 5,412,414 | 5/1995 | Ast et al. | 342/174 |
| 5,432,516 | 7/1995 | Cherry et al. | 340/436 |
| 5,453,740 | 9/1995 | Gallagher et al. | 340/903 |
| 5,517,196 | 5/1996 | Pakett et al. | 342/70 |
| 5,638,281 | 6/1997 | Wang | 701/301 |
| 5,640,143 | 6/1997 | Myron et al. | 340/541 |
| 5,694,130 | 12/1997 | Suzuki et al. | 342/70 |
| 5,696,515 | 12/1997 | Zyren et al. | 342/104 |
| 5,703,539 | 12/1997 | Gillig et al. | 331/16 |
| 5,826,216 | 10/1998 | Lyons et al. | 702/143 |
| 5,839,096 | 11/1998 | Lyons et al. | 702/183 |
| 5,867,536 | 2/1999 | Lyons et al. | 375/29 |
| 5,872,536 | 2/1999 | Lyons et al. | 342/70 |
| 5,949,366 | * 9/1999 | Herrmann | 342/72 |

* cited by examiner

*Primary Examiner*—Van T. Trieu
(74) *Attorney, Agent, or Firm*—Iandiorio & Teska (57) ABSTRACT

A wide angle, static, positional anticipatory object detection system includes a transducer device for transmitting a modulated carrier signal and receiving the modulated carrier signal reflected from an object, a detection device for detecting a plurality of Doppler shifted harmonic components from the reflected modulated carrier signal, a range determining device responsive to the amplitudes of at least two of the harmonic components being equal for determining the instantaneous range of the object and, a predetermined distance thereafter, to a predetermined difference between the amplitudes of at least two of the harmonic components. The system also includes a Doppler period measurement device responsive to at least one of the harmonic components for measuring the Doppler periods of that harmonic component and a collision decision device, responsive to the range determining device and the Doppler period measurement device, for indicating that a collision with the object is imminent and the offset of the collision from the detection device before contact is made.

18 Claims, 11 Drawing Sheets

WIDE-ANGLE, STATIC AND POSITIONAL ANTICIPATORY OBJECT DETECTION SYSTEM

FIELD OF INVENTION

This invention relates generally to an anticipatory object detection system, and more particularly to an anticipatory object detection system for an automobile passenger restraint system which detects a Doppler shift in a received signal reflected from an object, determines the range of the object and whether a collision with the object is imminent, and if so, determines the offset of the collision from the center of the automobile.

BACKGROUND OF INVENTION

Air bags are widely used in passenger cars, light trucks and vans as auxiliary protection devices to seat belts for increased driver and occupant protection in collision situations. The air bag was designed to enhance the protection offered by seat belt systems, especially in higher speed front impact crashes where minor belt-induced injuries and serious head and chest injuries can still occur to occupants restrained only by seat belts.

In most collisions, the decision to deploy the air bag is not made until late in the crash event, after contact with an object when a shift of occupant position is likely. This leaves the occupant vulnerable to serious injury or death by the inflation or unfurling of the air bag as it deploys. This raises particular concerns when the occupants are children or the elderly who tend to be more physically susceptible to injury. One method of mitigating injuries caused by deployment of the air bag is to use a pre-crash sensor to detect an imminent collision and help reduce the decision time of air bag deployment.

Primarily for reasons of economy, crash detection technology is currently provided by the use of a single point, fully electronic sensor located in the passenger compartment. The function of the crash sensor is to measure the crash severity as it occurs by measuring changes in velocity and, if a threshold is exceeded, air bag inflation is initiated. The output of this sensor is processed in a variety of ways. It can be filtered to provide a measure of the basic crash pulse, analyzed to establish the rate of acceleration change, integrated to indicate velocity change, or analyzed for frequency content or other parametrics. These measurements are then evaluated by a fuzzy logic system to provide reliable determination of the severity of the crash in progress, thus allowing for deployment initiation as early as possible. However, this processing takes time. In low speed crashes which produce velocity changes at or near the deployment threshold, the decision to deploy the air bag is not made until very late in the crash event, typically 25–50 milliseconds after contact. In such lower speed crashes an unbelted occupant will move closer to the air bag before inflation when compared to an occupant in a higher severity crash. The close proximity to the deploying air bag increases the chance of severe injury or death to the occupant as the pellets explode to inflate the air bag, not only because of the force of the inflating air bag, but from the heat generated from the explosion as well. Thus, current crash sensing technology provides less than ideal protection to the occupant in slower speed crashes.

A wide range of sensing devices have been investigated for a pre-crash sensor, including ultrasonic, infrared, and microwave radar. Of these, microwave radar has proven to be the strongest candidate for pre-crash detection for the simple reason that microwave radar is less affected by most environmental conditions that exist in driving situations, unlike ultrasonic and infrared sensors.

Use of microwave radar for primary air bag deployment has been investigated in the past. However, these systems required the use of Fast Fourier Transforms (FFT) to extract the harmonic components, which typically cost hundreds of dollars, and complex processors to run the systems due to the complex calculations performed. Other systems that performed harmonic binning spent considerable time monitoring each harmonic amplitude to determine range. These systems also required complex processors to perform the calculations necessary to detect the range of an object. Further, given the number of calculations, these processors required considerable time to determine the range and necessarily lag behind the actual range of fast moving objects. Thus, the high cost of early systems as well as the inability of radar to determine target mass deemed the use of microwave radar unacceptable. These pre-crash sensors detected objects that were too distant to pose a threat, or objects that were not on a collision path with the automobile such as mailboxes, signs and sidewalks.

U.S. Pat. No. 5,826,216, which is commonly assigned with the present invention, and is incorporated herein in its entirety, discloses a system that effectively uses microwave technology to determine if and when a collision will occur. However, it does not determine the offset of the collision from the sensor, which can be useful in eliminating objects which are not on a collision path with the automobile and for enabling a passive restraint system of the automobile to react appropriately, depending on where on the automobile the collision will take place.

SUMMARY OF INVENTION

It is therefore an object of this invention to provide an improved anticipatory collision sensor system that provides information regarding the location of a collision.

It is a further object of this invention to provide such an anticipatory collision sensor system that allows an air bag to deploy earlier in the crash event.

It is a further object of this invention to provide such an anticipatory collision sensor system that includes a single non-scanning sensor.

It is a further object of this invention to provide such an anticipatory collision sensor system that can determine that a collision is imminent before contact with an object.

It is a further object of this invention to provide such an anticipatory collision sensor system that is not affected by atmospheric conditions.

It is a further object of this invention to provide such an anticipatory collision sensor system that is cost effective to manufacture and implement.

It is a further object of this invention to provide such an anticipatory collision sensor system that complies with FCC regulations.

It is a further object of this invention to provide such an anticipatory collision sensor system that has a broad field of view.

It is a further object of this invention to provide such an anticipatory collision sensor system that can detect the range of an object within a predetermined distance that represents the range in which the object poses a threat.

It is a further object of this invention to provide such an anticipatory collision sensor system that eliminates objects that are not on a collision course.

It is a further object of this invention to provide such an anticipatory collision sensor system that reduces the risk of false alarms.

The invention results from the realization that a truly effective passenger restraint system can be achieved by using an anticipatory object detection system including an object detection device, which determines the range of an object by detecting the intersection of the amplitudes of the harmonic components of the reflected signal from an object which implies the instantaneous range of the object, thereafter tracking its range by counting the Doppler cycles of the reflected signal, and a Doppler period measurement device which determines a difference in consecutive periods of the Doppler frequency of the reflected signal so that a decision device can determine the likelihood and position of a collision based on the range and positional information, and the passenger restraint system can be signaled, prior to impact with the object, that collision with the object is imminent and the offset of the collision from the center of the automobile.

This invention features a wide angle, static, positional anticipatory object detection system including a transducer device for transmitting a modulated carrier signal and receiving the modulated carrier signal reflected from an object. A detection device is included for detecting a plurality of Doppler shifted harmonic components from the reflected modulated carrier signal. A range determining device is responsive to the amplitudes of at least two of the harmonic components being equal for determining the instantaneous range of the object and, a predetermined distance thereafter, to a predetermined difference between the amplitudes of at least two of the harmonic components. A Doppler period measurement device is responsive to at least one of the harmonic components for measuring the Doppler periods of that harmonic component and a collision decision device is responsive to the range determining device and the Doppler period measurement device for indicating that a collision with the object is imminent and the offset of the collision from the detection device before contact is made.

In a preferred embodiment, the collision decision device may include means for comparing consecutive Doppler periods of the harmonic component and determining the offset of the collision based on the difference of consecutive Doppler periods of said harmonic component. An increase in the difference in consecutive Doppler periods may indicate an increase in the offset. The collision decision device may include means for determining if the difference exceeds an offset threshold value, in which case a collision will not occur. The threshold may correspond to an offset which occurs beyond a predetermined target width. The range determining device may include means for detecting when the amplitude of one of the harmonic components exceeds a predetermined threshold value. The range determining device may further include means for detecting when the difference in amplitude between one of the harmonic components relative to the amplitude of another of the harmonic components exceeds a second threshold value. The range determining device may further include means for detecting when the amplitude of one of said harmonic components is equal to the amplitude of the other of the harmonic components to determine the instantaneous range of the object. The collision decision device may include means for detecting when the difference of consecutive Doppler periods exceeds a third threshold valve, in which case a collision with the object will not occur. The decision device may further include means for indicating that collision is imminent and indicating the offset of the collision based on the difference of the last two consecutive periods which occur within the predetermined distance. The collision decision device may further include means for determining if a change in the value of one of the harmonic components exceeds a fourth threshold after the predetermined distance, thereby further confirming that a collision is imminent.

This invention also features an anticipatory object detection system including a transducer device for transmitting a modulated carrier signal and receiving the modulated carrier signal reflected from an object. A detection device is included for detecting a plurality of Doppler shifted harmonic components from the reflected modulated carrier signal. A range determining device is responsive to the amplitudes of at least two of the harmonic components being equal for determining the instantaneous range of the object and, a predetermined distance thereafter, to a predetermined difference between the amplitudes of at least two of the harmonic components. A Doppler period measurement device is responsive to the frequency of at least one of the harmonic components for measuring a change in consecutive Doppler periods of the harmonic components during said predetermined distance and a microprocessor is responsive to the range determining device and the Doppler period measurement device for determining if a collision with the object is imminent and, if so, the position of the collision relative to the detection device.

This invention also features a method for determining the probability and offset of a collision, the method including the steps of transmitting a modulated carrier signal, receiving the modulated carrier signal after it is reflected from an object, detecting a plurality of Doppler shifted harmonic components from the reflected modulated carrier signal and determining the instantaneous range of the object based on the amplitudes of at least two of the harmonic components being equal. This invention further includes the steps of measuring Doppler periods of one of the harmonic components, determining differences between the Doppler periods of the harmonic component, and indicating that a collision with the object is imminent and the offset of the collision based on the differences in the Doppler periods.

In a preferred embodiment, the offset may be determined by a difference in consecutive Doppler periods. The method may include the step of determining if a difference in consecutive Doppler periods exceeds a threshold, in which case a collision is not imminent, wherein the threshold may indicate an offset which is beyond the periphery of the object.

BRIEF DESCRIPTION OF THE DRAWINGS

Other objects, features and advantages will occur to those skilled in the art from the following description of a preferred embodiment and the accompanying drawings, in which.

DETAILED DESCRIPTION

Figure 1A:
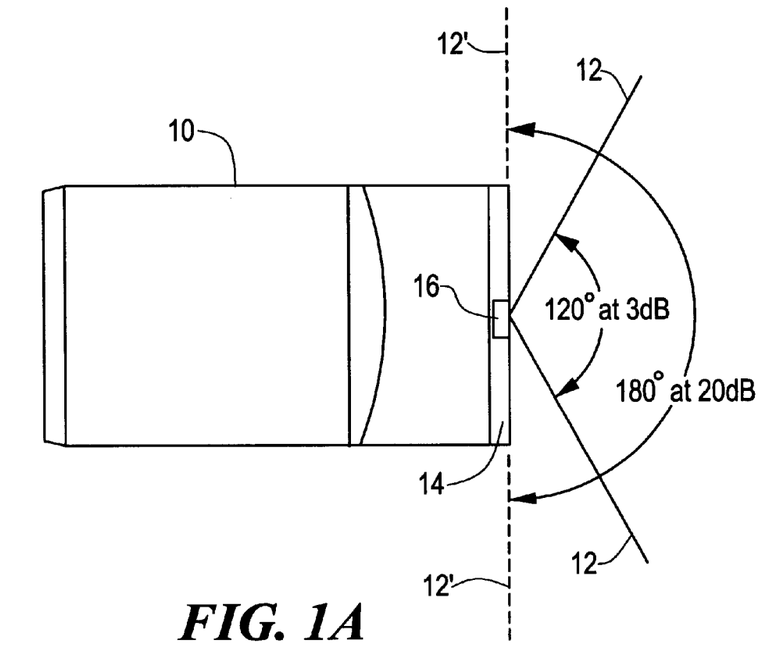
FIG. 1A is a top view of an automobile showing the horizontal field of view of the anticipatory object detection system of the present invention.

There is shown in FIG. 1A an anticipatory object detection system 16 centrally located within a bumper 14 of an automobile 10. Object detection system 16 transmits a radar signal which produces a radar cone 12 having a horizontal radiation cross section of 120° at 3 dB directed in front of automobile 10. However, at 20 dB the effective cross section or field of view is 180° and is represented by the dashed line 12'. It is the effective field of view 12' that allows the object detection system 16 to detect potential colliding objects directly in front of the automobile 10 as well as objects to either side of the automobile 10.

Figure 1B:
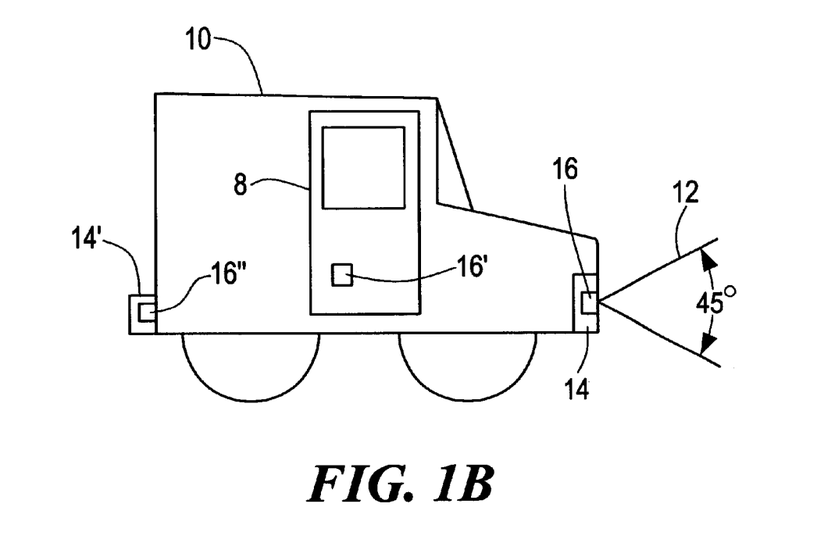
FIG. 1B is a side view of FIG. 1A and shows the vertical field of view of the object detection system of the present invention.

FIG. 1B is a side view of the automobile 10 of FIG. 1A. Object detection system 16 centrally located within bumper 14 produces the same radar cone 12 as shown in FIG. 1A, however, the vertical radiation cross section of the radar cone is 45°. Object detection system 16 may be adjusted to project a radar cone 12 a predetermined height and distance in front of the automobile 10. It should be noted that the object detection system 16 is not limited to being located in the front bumper. Anticipatory object detection system 16 may be located at any location that may potentially encounter a collision with an object. For example, object detection system 16' may be located within the doors 8 of the automobile 10 to detect a side impact, or in the rear bumper 14' to detect a collision from behind. The object detection system is generally located equidistant from the edges of the automobile. This allows not only symmetric protection around the automobile, but also the use of simpler software which reduces processing time by the microprocessor.

Figure 2:
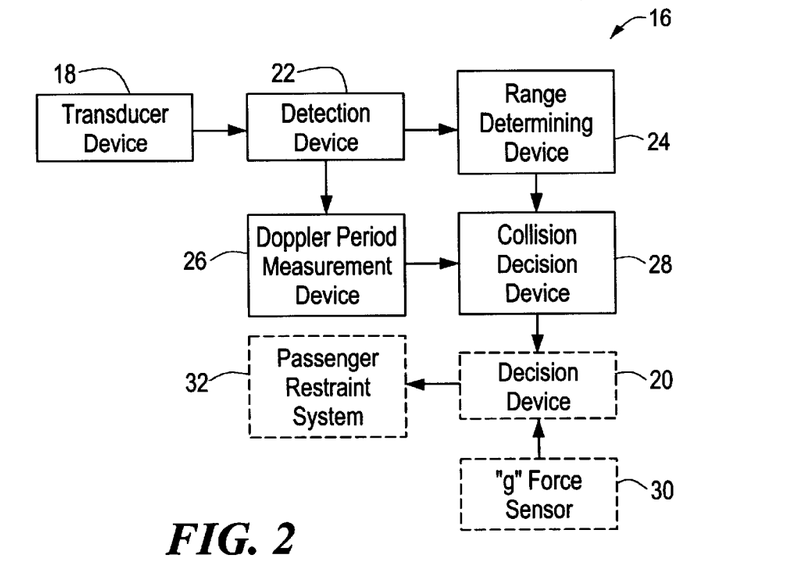
FIG. 2 is a simplified block diagram of an improved crash detection system using an anticipatory object detection system according to this invention.

Anticipatory object detection system 16 is shown in more detail in FIG. 2. A transducer device 18 transmits a modulated carrier signal, for example, a radar signal. The modulated carrier signal then encounters, within a predetermined range of transducer device 18, a potential colliding object which reflects the signal. Due to the Doppler effect, the reflected signal will be shifted in frequency. The shift will be dependent on whether the object and vehicle are moving towards or away from each other. For example, for an object moving towards the object detection system 16 the frequency of the reflected signal will be higher than the frequency of the transmitted signal. For an object moving away from the object detection system 16 the frequency of the reflected signal will be lower than the frequency of the transmitted signal.

The reflected modulated carrier signal is received by transducer device 18, and a detection device 22 beats the received, reflected modulated carrier signal with the modulated carrier signal. This produces a composite Doppler signal having a frequency which is the frequency difference between the two signals, representing the Doppler shift of the reflected signal, and is comprised of a plurality of Doppler shifted harmonic components. This Doppler shift is present throughout the signal and thus present in all components of the signal. The envelope of the signals produced by detection device 22 represents the Doppler frequency. Detection device 22 extracts the Doppler which envelops the harmonic components of the modulation signal of the Doppler signal. Once the Doppler is extracted, range determining device 24 determines the range of an object by comparing the amplitudes of the Doppler in each harmonic component relative to each other. When the object is within a predetermined range, defined by the intersection of two predetermined harmonic components, a Doppler period measurement device 26 determines the instantaneous period of the Doppler as discussed in more detail with respect to FIG. 4. Range determining device 24 continues to monitor the amplitudes of the Doppler of the harmonic components. The harmonic components are monitored by comparing their relationship relative to each other to predetermined values that represent what these amplitudes would be in an actual collision. Anticipatory collision decision device 28 determines that a collision is imminent, based on range information from range determining device 24 and collision offset information from Doppler period measurement device 26, and sends a fire signal, along with offset information, to a decision device 20, shown in phantom, typically part of an existing passenger restraint system. Decision device 20 receives this information along with information obtained from a conventional g force sensor 30, also shown in phantom. The g force sensor 30 is typically located within the passenger compartment. While the preferred embodiment is directed to an airbag passenger restraint system, anticipatory collision sensor system 16 may be used in conjunction with seatbelt pre-tensioners which tighten the seatbelts early in the collision prior to impact. Further, the anticipatory collision sensor system may be used as a primary sensor as well as a sensor for augmenting g force sensor 30 or as an audible or visual alarm.

Figure 3:
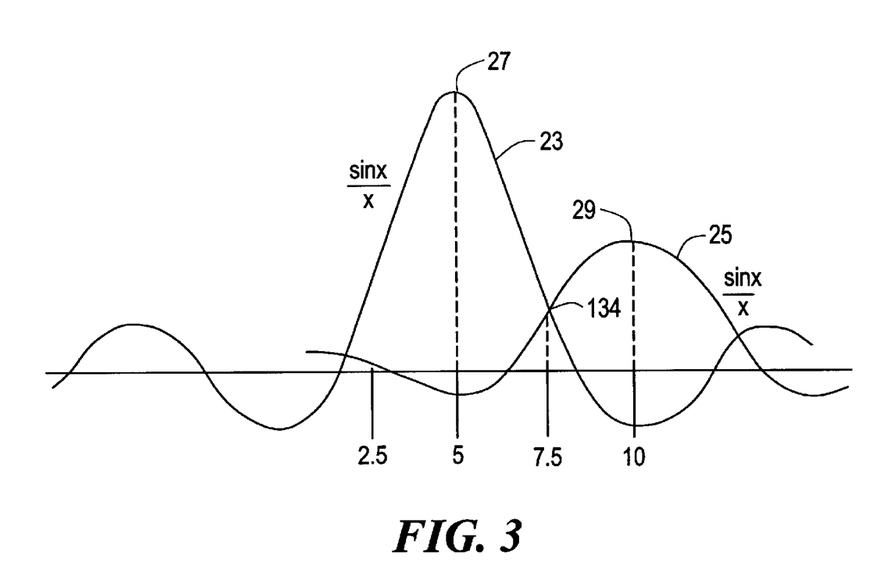
FIG. 3 is a representation of the actual amplitudes of the first and second harmonic components of the modulation signal of the Doppler signal.

The actual amplitudes of the first and second harmonic components of the modulation signal are represented by waveforms 23 and 25, as shown in FIG. 3, respectively. In a modulated carrier signal, the harmonic components of the modulation signal will peak at fixed distances for a given bandwidth of the carrier signal independent of frequency. For example, in a modulated carrier signal in which the carrier signal has a bandwidth of 100 MHz, the first harmonic component 23 of the modulation signal has a peak 27 at 5 feet. Similarly, the second harmonic component 25 of the modulation signal has a peak 29 at 10 feet. The point 134 at which the two harmonic components intersect will be ½ the distance between the peaks, or 7.5 feet. Therefore, for a signal reflected from an object, where the amplitudes of the first and second harmonic components of the modulation signal are equal, the instantaneous range of the object is known. The distances at which the amplitudes peak can be directly controlled by the bandwidth of the carrier signal. For example, a carrier signal having a bandwidth of 200 MHz would have a first harmonic component of the modulation signal peak at 2.5 feet and the second harmonic component would peak at 5 feet. Thus, the range of an object can be detected based solely on the bandwidth of the carrier signal regardless of the frequency of either the carrier signal or the modulation signal. Once the instantaneous range of an object is determined, the instantaneous range of the object can be tracked by counting the Doppler cycles, discussed in greater detail with respect to FIG. 4, from that point on where each Doppler cycle represents the relative movement of the object in 1 inch increments due to the 5.8 GHz transmit frequency. The range detected is the radial distance from the antenna.

Figure 4:
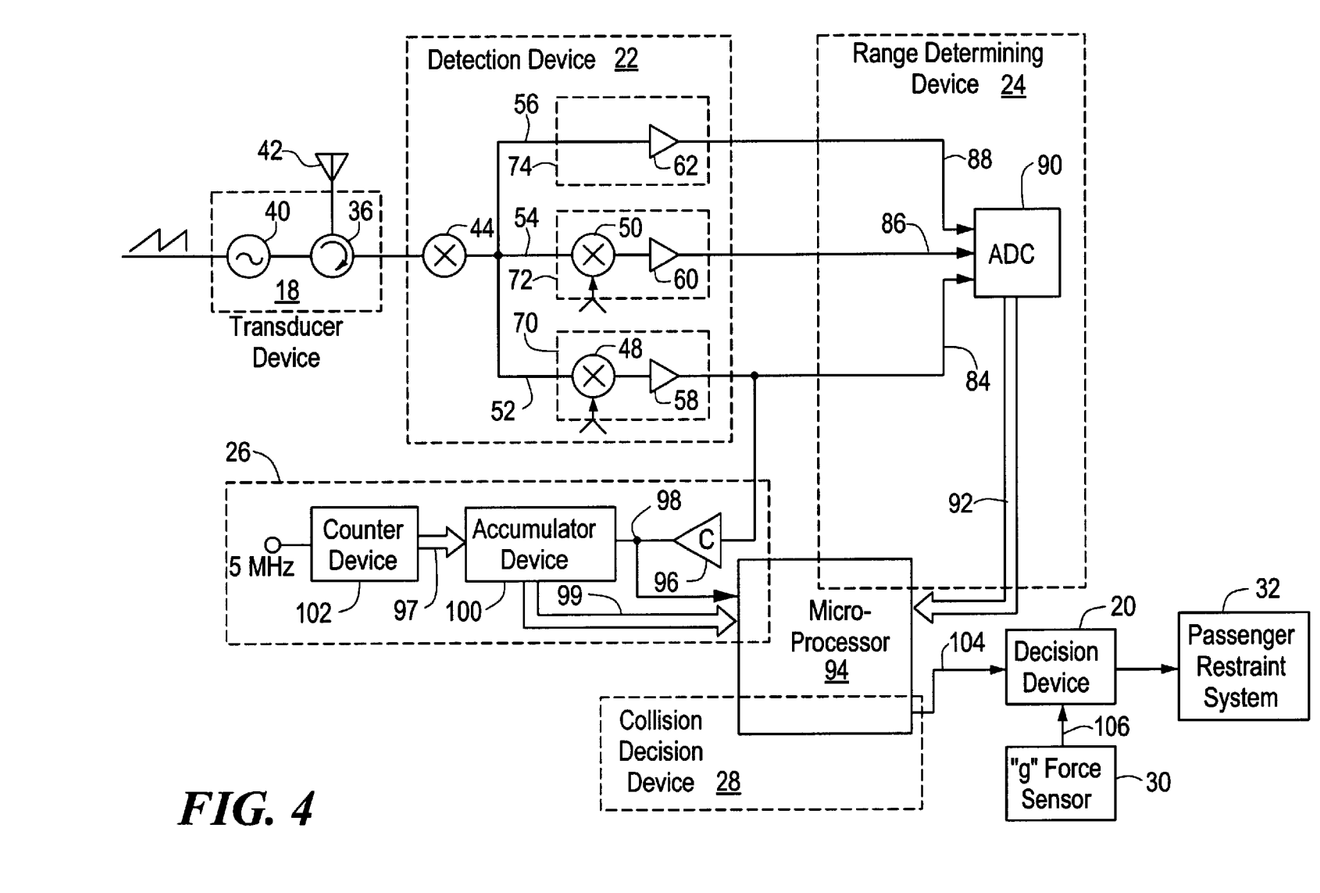
FIG. 4 is a more detailed schematic of the anticipatory object detection system according to this invention.

A more detailed schematic of the anticipatory collision detection system is shown in FIG. 4. Transducer device 18 includes a voltage controlled oscillator 40 which generates a carrier signal having a center frequency of 5.8 GHz. In order to remain within FCC guidelines for unlicensed sensor operation, the bandwidth of the signal must be such that the carrier signal stays within the range of 5.725 GHz to 5.875 GHz. In this embodiment, the carrier signal is modulated at a frequency of 156.25 KHz. The frequency range, or bandwidth, of voltage controlled oscillator 40 is dictated by the changes in amplitude of the modulation signal. The modulation frequency is typically chosen to be at least ten times larger than the Doppler frequency. It must be of sufficient frequency such that leakage throughout the system will not affect the Doppler frequency. A circulator 36 delivers the modulated carrier signal to antenna 42.

Antenna 42 transmits the modulated 5.8 GHz carrier signal, which is reflected off objects within a predetermined range, typically two to ten feet away to just beyond the bumper. The reflected signal is then received by antenna 42. The transducer device 18 and mixer 44 of the preferred embodiment are provided in a single MMIC radar chip manufactured by Hittite Corporation of Massachusetts and includes a single transmit/receive antenna. However, independent transmit and receive antennas may be used. It is important, however, that a broad beam antenna is used to provide sufficient field view of the system.

Detection device 22 beats the received signal with the modulated carrier signal using mixer 44. The local oscillator for mixer 44 is provided by the leakage of the modulated carrier signal from circulator 36. Mixer 44 produces a beat frequency, or composite Doppler signal, which is the frequency difference between the modulated carrier signal and the received reflected signal. The composite Doppler signal is comprised of a plurality of signals to include the harmonic components of the reflected modulation frequency. The frequency of the harmonics of the modulation frequency present in the composite Doppler signal differ from the modulation frequency by the Doppler frequency.

Figure 5A:
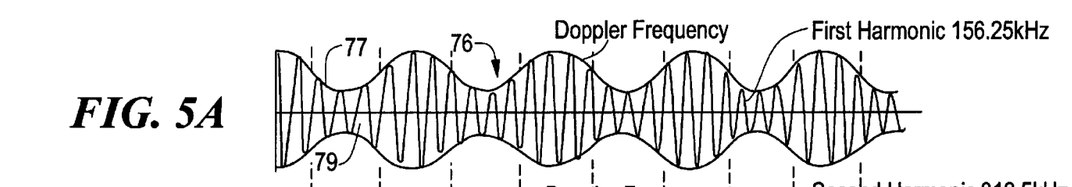
FIG. 5A is a representation of the first harmonic of the modulation signal of the Doppler signal received from a potential colliding object, the envelope of which represents the Doppler shift.

For purposes of this embodiment, the harmonic components of interest are the first harmonic component, the second harmonic component and the DC harmonic component of the modulation signal. Detection device 22 contains a plurality of signal paths 52, 54, and 56 which deliver the Doppler shifted harmonic components to a plurality of channels 70, 72, and 74 respectively, for extracting the Doppler from the harmonic components. In a preferred embodiment, channel 70 contains a mixer 48 which mixes the Doppler shifted first harmonic component, represented by waveform 76 as shown in FIG. 5A, with the modulation signal, 156.25 KHz. Envelope 77 represents the Doppler frequency while the first harmonic is represented by waveform 79. This demodulation extracts the Doppler of the first harmonic component of the modulation signal, or first Doppler. Channel 70, FIG. 4, also includes a Doppler amplifier 58 which includes a pulse shaping circuit that amplifies and rectifies the first Doppler. This signal is represented by waveform 81 as shown in FIG. 5C. Thus, this signal has the frequency of the Doppler frequency and the amplitude represents the variations of the first harmonic component of the modulation signal of the reflected signal. The Doppler amplifier 58 supplies the amplified, rectified, first Doppler to a range determining device 24. Range determining device 24, which includes an analog to digital converter 90 and microprocessor 94, performs peak detection by recording the highest amplitude of the measured rectified Doppler within a given Doppler clock period shown at 83 in FIG. 5E. This process is carried out in the microprocessor 94, which samples the signal 81, FIG. 5C, to obtain a number of samples 82, FIG. 5D. During each Doppler clock period 83, FIG. 5E, the microprocessor 94 detects the peak by comparing the second sample to the first sample and retaining the greater of the two samples as the peak sample. The peak sample is then compared to the third sample, and the greater of the two samples is retained as the peak sample. This process is continued with all of the samples during each clock period to detect the peak value 84, FIG. 5F for each clock period.

Figure 5B:
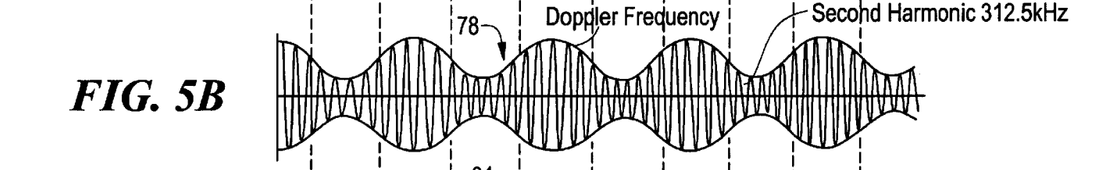
FIG. 5B is a representation of the second harmonic of the modulation signal of the Doppler signal received from a potential colliding object, the envelope of which represents the Doppler shift.
Figure 5C:
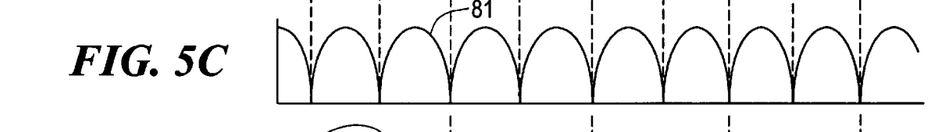
FIG. 5C is a representation of the demodulated $K^{th}$ harmonic of the Doppler frequency.
Figure 5D:
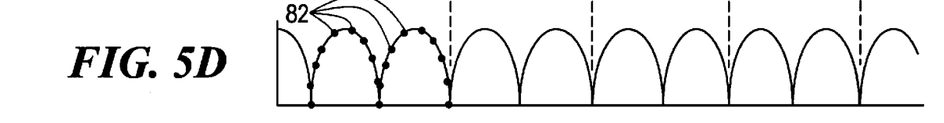
FIG. 5D is a representation of the digital sampling used to determine the peak of the signal of the harmonic of FIG. 5C.

In a similar manner as channel 70, channel 72 contains a mixer 50 which mixes the Doppler shifted second harmonic component, represented by waveform 78 as shown in FIG. 5B, with a signal which is twice the frequency of the modulation signal, 312.5 KHz. This demodulation produces the Doppler of the second harmonic component, or second Doppler, of the modulation signal. Channel 72 also contains Doppler amplifier 60 which includes a pulse shaping circuit which amplifies and rectifies the second Doppler. This signal is similar to that illustrated by waveform 81 in FIG. 5C. The amplified, rectified second Doppler is then delivered to range determining device 24. Range determining device 24 performs peak detection over the Doppler clock period similar to that described above.

Channel 74 includes a Doppler amplifier 62 which amplifies and rectifies the Doppler signal to produce the Doppler of the direct current (DC) or fundamental harmonic component, or DC Doppler, of the reflected modulation signal. The peak of the DC Doppler is determined over the Doppler clock period as described above.

The first Doppler, second Doppler, and DC Doppler are delivered to an analog to digital converter 90 via signal paths 84, 86 and 88 respectively. Analog to digital converter 90 converts the DC voltages to digital signals which it then supplies to a microprocessor 94 via signal bus 92. Microprocessor 94, through the implementation of software discussed below, monitors the Doppler amplitude of each harmonic component and its relationship with the Doppler amplitudes of the other harmonic components to determine the instantaneous range of an object. The instantaneous range is determined using intersection of the first and second Doppler amplitudes. The amplitude, phase, and relative Doppler sideband character of each of the harmonic components are a function of object range, relative velocity magnitude, and peak-to-peak frequency deviation. Once a predetermined relationship between the harmonics is detected, microprocessor 94 enables Doppler period measurement device 26 to measure the instantaneous period of the Doppler.

Figure 5E:
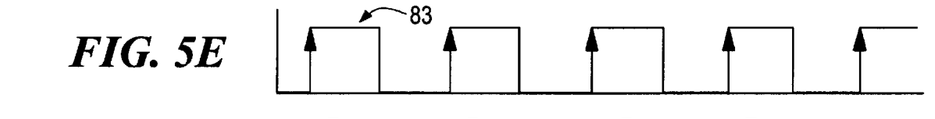
FIG. 5E is a representation of the Doppler clock in accordance with the present invention.
Figure 5F:
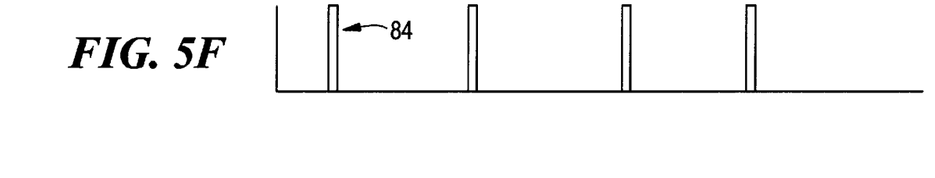
FIG. 5F is a representation of the peak of the harmonic of FIG. 5C for each Doppler period of FIG. 5E.

Doppler period measurement device 26 includes a comparator device 96. In one embodiment, comparator 96 is connected to the output of channel 70 of detection device 22 since the first harmonic component has the greatest amplitude. However, comparator 96 may be placed at the output of either channel 72 or 74. Comparator 96 receives the amplified, rectified first Doppler and compares the level of that output to a predetermined value. If the level of the input exceeds a predetermined value, comparator 96 outputs a high signal. If the input does not exceed the predetermined value, comparator 96 outputs a low value. The resulting output, a series of Doppler pulses illustrated by waveform 82 as shown in FIG. 5E, is delivered over signal path 98 to an accumulator device 100, such as a capture register. Doppler period measurement device 26 also includes a counter device 102 interconnected with accumulator device 100 via signal bus 97. Counter device 102, driven by an internal 5 MHz clock, continuously counts the cycles of the 5 MHz clock. With every rising edge of the Doppler pulse from comparator 96, accumulator device 100 sends an interrupt to microprocessor 94, a portion of which is shared with range determining device 24, and simultaneously reads counter device 102 and stores the number of cycles counted. With every interrupt received by microprocessor 94 from accumulator device 100 microprocessor 94 reads the cycle count stored in accumulator device 100, resets counter device 102 and increments a Doppler count by 1. Thus, Doppler period measurement device 26 counts the number of 5 MHz clock pulses that occur for each Doppler pulse. Since the Doppler pulse is derived from a rectified Doppler component, each pulse represents one Doppler cycle. The process is repeated with each rising edge of the Doppler pulse, each 5 MHz cycle count being added to the previous cycle count stored in microprocessor 94, until the Doppler count is equal to 4. Once the Doppler count equals 4, the microprocessor 94 discontinues reading accumulator device 100 and divides by 4 the total count stored to provide an average 5 MHz cycle count. Microprocessor 94 then determines the instantaneous Doppler period of the signal. Accumulator device 100 continues to send an interrupt to microprocessor 94 with every rising edge of the Doppler pulse and, with every interrupt it receives from accumulator device 100, microprocessor 94 continues to increment the Doppler count. The Doppler count represents the number of Doppler pulses received, each pulse being equivalent to 1 inch of relative movement by the object since each Doppler cycle is one wavelength of the 5.8 GHz carrier signal. This continues for 30 cycles, which corresponds to 30" of travel of the object. Thus, once the intersection of the first and second Doppler is detected, giving an instantaneous range of the object, the object's range thereafter can be tracked by counting the Doppler pulses reflected from the object.

While the Doppler period is being determined, microprocessor 94, a portion of which is included in a collision decision device 28, monitors the change in the period of the Doppler, the amount of change representing the offset of a collision. When collision decision device 28 has determined that a collision is imminent, a fire signal along with the offset information is sent to decision device 20 via signal path 104. In the preferred embodiment microprocessor 94, analog to digital converter 90, counter device 102 and accumulator device 100 are contained in a single chip, Model PIC16C74, available from Microchip of Chandler, Ariz.

Figure 6:
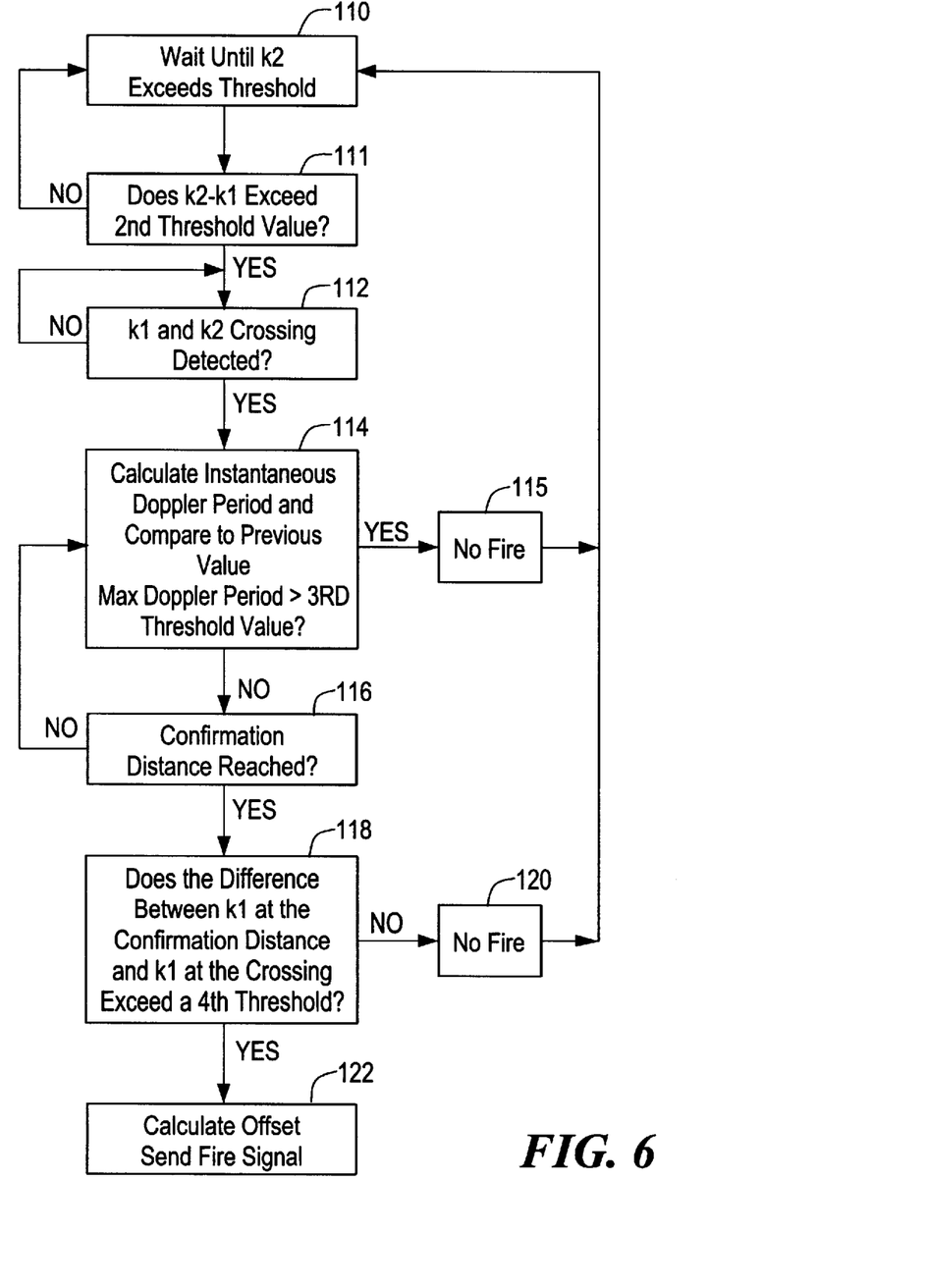
FIG. 6 is a flow chart of the algorithm used by the anticipatory object detection system to monitor the amplitude and period of the Doppler in the first and second harmonic components of the modulation signal of the Doppler signal to determine that a collision is imminent.

The software implemented by microprocessor 94 to monitor the Doppler amplitudes of the harmonic components is illustrated by the flow chart of FIG. 6. In step 110 microprocessor 94, FIG. 4, monitors the amplitude of the second Doppler, K2, to determine when it exceeds a first threshold value, which insures that the second Doppler is indeed a reflection from an object and not extraneous noise. Once this threshold value has been exceeded, the microprocessor 94 monitors the difference between K2 and the amplitude of the first Doppler, K1, to determine whether that difference exceeds a second threshold value, step 111. If that second threshold value is not exceeded, the software returns to step 110 continuing to monitor K2. However, if the difference between the two harmonic components exceeds the second threshold value, microprocessor 94, FIG. 4, monitors K2 and K1, to detect when K1 equals K2, step 112, at which point the instantaneous range of the object is known. If K1 equals K2, step 112, microprocessor 94 initializes Doppler period measurement device 26, FIG. 4 and calculates the instantaneous Doppler period and compares the current Doppler period measurement with the previous Doppler period measurement, step 114. A difference in the consecutive Doppler periods indicate that the potential collision object is moving away from the detection device 22, FIG. 4. These differences are used to determine the amount of offset of the collision from the detection device, as will be discussed in greater detail below. If the difference between consecutive Doppler periods exceeds a third threshold, which indicates that the offset is beyond the periphery of the vehicle, no fire signal is sent, step 115, and the microprocessor returns to monitoring K2, step 110. Microprocessor continues to determine the difference between consecutive Doppler periods until the confirmation distance is reached, step 116. This confirmation distance is determined by counting the Doppler pulses, each pulse translating to 1 inch of relative movement, from the intersection of K1 and K2 where the range is known. In the preferred embodiment, the confirmation distance is approximately 30" from the point where K1=K2. Once that confirmation distance has been achieved, the microprocessor device determines whether the difference between the value of K1, at the confirmation distance and the value of K1, at the crossing exceeds a fourth threshold value, step 118. This insures that the object that initiated the process at step 110 is still approaching the automobile and has not veered out of the path of the automobile, in which case the value of K1 at the confirmation distance will be less than or approximately equal to the value of K1 at the crossing. If the difference between the K1 values exceeds the fourth threshold, which is preferably approximately 5 db, the microprocessor device sends a fire signal and collision offset information, step 122, to the decision device 20, FIG. 4. If the difference between the K1 /values does not exceed the fourth threshold, no fire signal is sent, step 120, and the microprocessor returns to monitoring K2, step 110. This operation is discussed in greater detail below with reference to FIG. 7.

Figure 7:
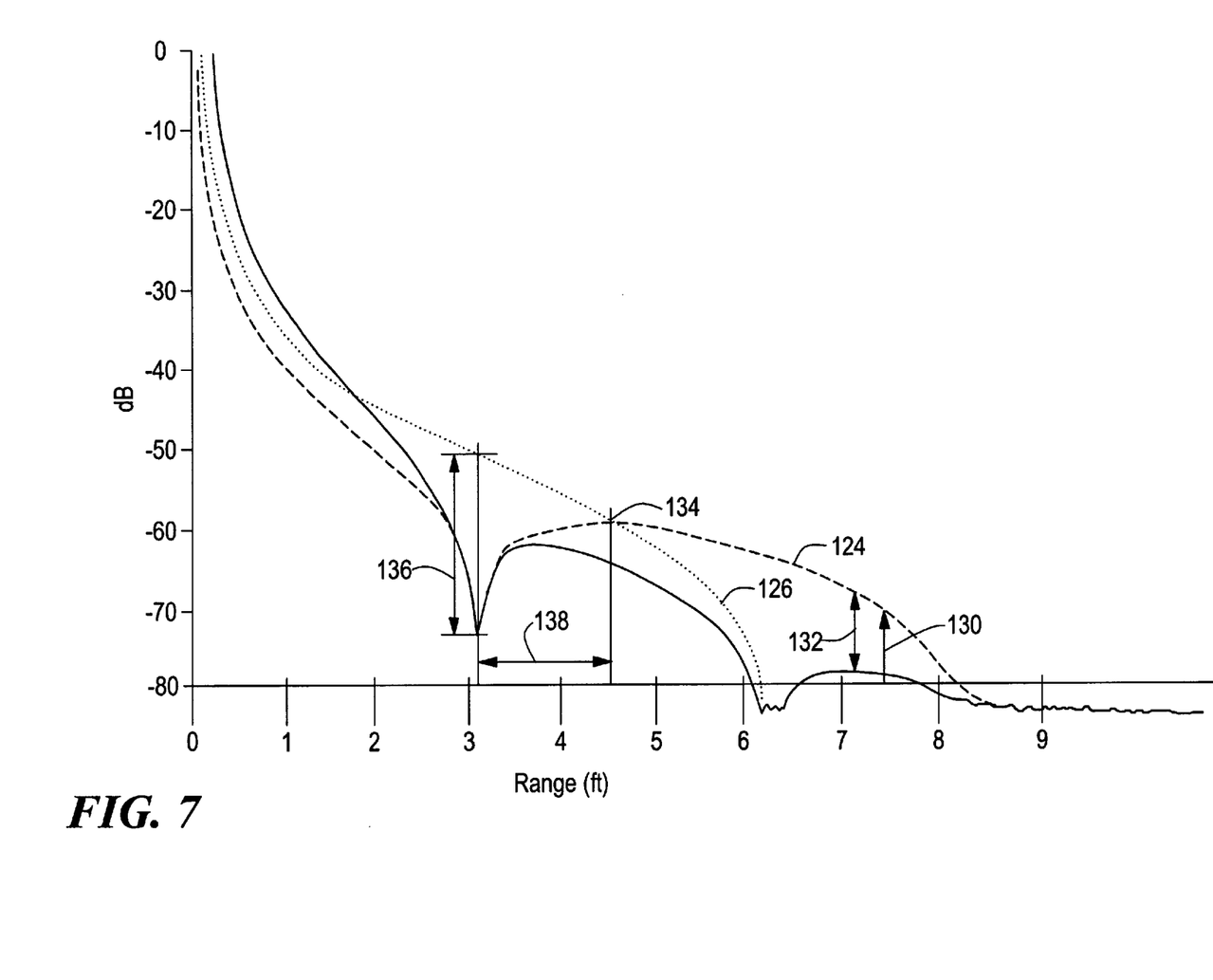
FIG. 7 is a graphic representation of the typical amplitudes of the Doppler in each harmonic relative to each other.

An example of the Doppler amplitudes that microprocessor 94, FIG. 4, is monitoring are illustrated in FIG. 7. When the amplitude of the second Doppler, K2, 124 exceeds a first threshold value 130, step 110, FIG. 6, the microprocessor monitors the difference between the amplitudes of the second Doppler 124 and the first Doppler, K1, 126 until the second threshold value 132 is detected, step 111, which represents the predetermined difference. Once this second threshold value 132 is detected, the microprocessor monitors the amplitude of the second Doppler 124 and the amplitude of the first Doppler 126 to detect when the amplitudes are equal. This is represented by crossing point 134. Once crossing point 134 has been detected, step 112, the microprocessor monitors the amplitude of the second Doppler 124 and the amplitude of the first Doppler 126 for a confirmation distance 138, step 116. This confirmation distance is generally equal to the distance from the sensor system to just beyond the edge of the automobile. Between the time of the crossing point 134 and at expiration of the confirmation distance 138, the microprocessor calculates the differences in consecutive periods of the Doppler signal, step 114. Once the microprocessor has waited for the confirmation distance 138 if the third threshold valve has not been exceeded, and the difference between the values of K1 at the crossing 134 and after the confirmation distance 138 exceed the fourth threshold value, the microprocessor determines that a collision is imminent and sends a fire signal, step 122, to the decision device 20, FIG. 4.

It should be noted that an offset of the Doppler components can be used to vary their relationships with each other and thus shift crossing 134 to a desired distance as well as confirmation distance 138. This simple offset adjustment performed in software within the microprocessor 94, FIG. 4, provides a degree of freedom for various pre-crash sensing applications where a single sensor is mounted in the center of a bumper of the automobile. Because the typical width of an automobile is 4 to 5 feet, the decision must be made just beyond the edge of the automobile so as not to induce false alarms. Thus, the system can be easily adapted for any size automobile.

Figure 8:
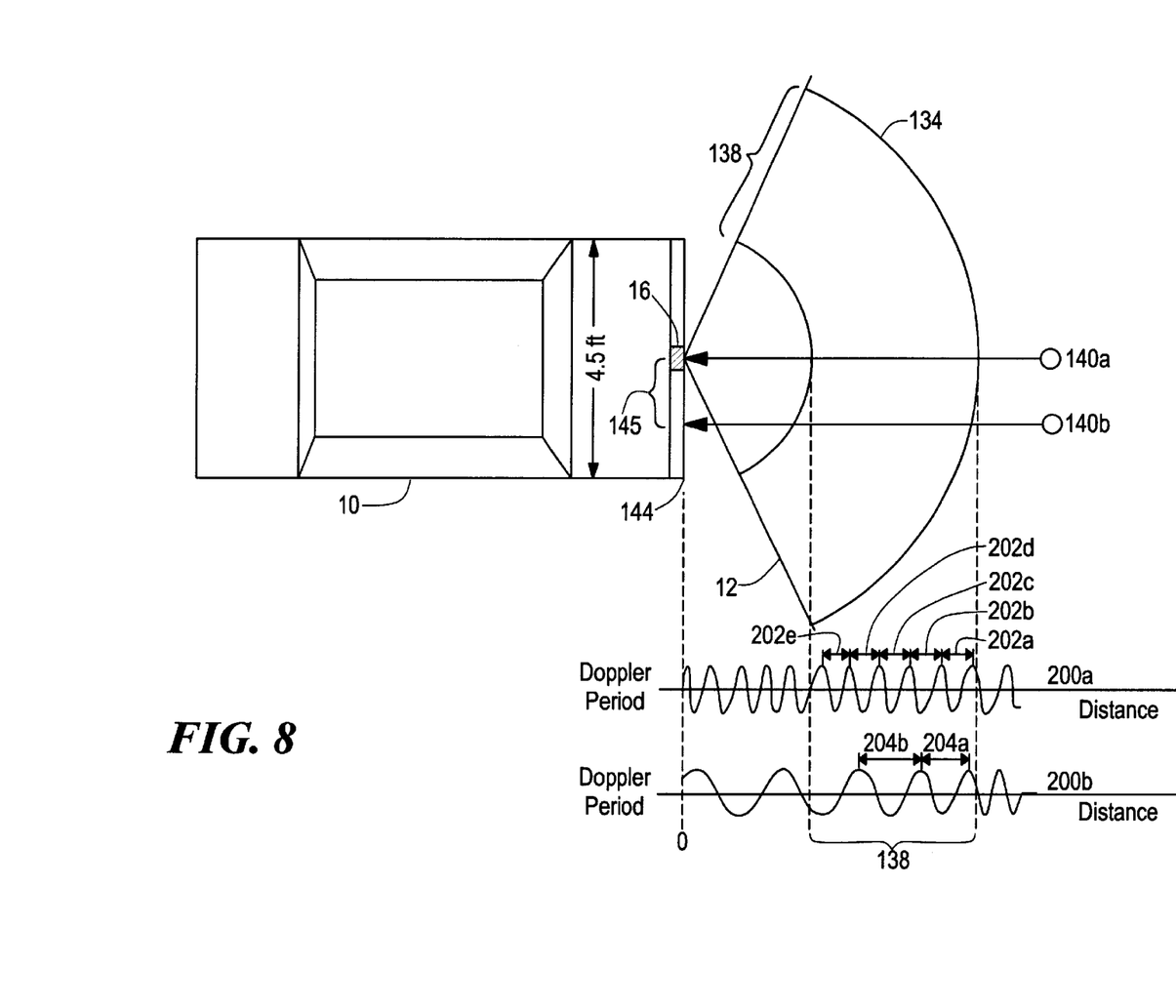
FIG. 8 illustrates an automobile on a collision course with two different objects approaching the automobile at 90° and a graph of the Doppler periods associated with each object.

The manner of detecting a collision or no collision condition and the offset of the collision can be understood more clearly with reference to FIG. 8 which shows the difference in the Doppler periods between a collision at the center of an automobile and a collision which is offset from the center. In FIG. 8, there is an anticipatory collision sensor system 16 mounted in the automobile 10 and producing a radar cone 12. A first object 140*a* is shown approaching the center of the automobile 10, as indicated by the anticipatory collision sensor system 16, at 90° from the bumper 144. Graph 200*a* shows the Doppler period of the signal reflected from object 140*a* and received by the detection device 22, FIG. 4, as the object approaches the bumper 144, located at the distance 0. A second object 140*b* is shown approaching the bumper 144 at 90°, however, it is offset from the center of the automobile by an offset distance 145. Graph 200*b* shows the Doppler period of the signal reflected from object 140*b* and received by the detection device 22, FIG. 4. Each object will be analyzed individually.

As object 140*a* approaches the automobile 10, the Doppler amplitudes of the harmonics of the signal reflected by object 140*a* are monitored by the microprocessor to determine when the amplitude of the second Doppler 124, FIG. 7, exceeds the first threshold value 130, FIG. 7. Once the first threshold value is exceeded, the microprocessor continues to monitor the Doppler amplitudes of the harmonics, as discussed above. When the crossing point 134 has been detected, the instantaneous range of the object 140*a* is 7.5 feet, as discussed with regard to FIG. 3. Upon detecting the crossing point 134, the microprocessor beings calculating the instantaneous Doppler period and compares the instantaneous value with the previous value to obtain a Doppler period change value. This comparison is carried out for 30 Doppler cycles.

Referring to graph 200*a*, it can be seen that, when the object 140*a* approaches the automobile 10 directly at the sensor 16, there is no change in the periods 202*a*–202*e* which are measured during the confirmation distance 138. Upon expiration of the confirmation distance 138, the microprocessor sends a fire signal including the offset distance information to the decision device 20. Since there is no change in any of the consecutive periods 202*a* and 202*e*, there is no offset and the collision will occur at the location of the sensor 16.

Referring to graph 200*b*, it can be seen that, when the object 140*b* approaches the automobile 10 at an offset from the sensor 16, the Doppler period increases as the object 140*b* approaches the automobile 10, as shown by periods 204*a* and 204*b*. This occurs because the object 140*b* is moving radially away from the sensor 16, causing the Doppler frequency to decrease, thus resulting in a change in the Doppler period. Upon expiration of the confirmation distance 138 the microprocessor determines the change in the period of the last two Doppler periods and refers to a look up table to determine the offset of the collision.

Figure 10:
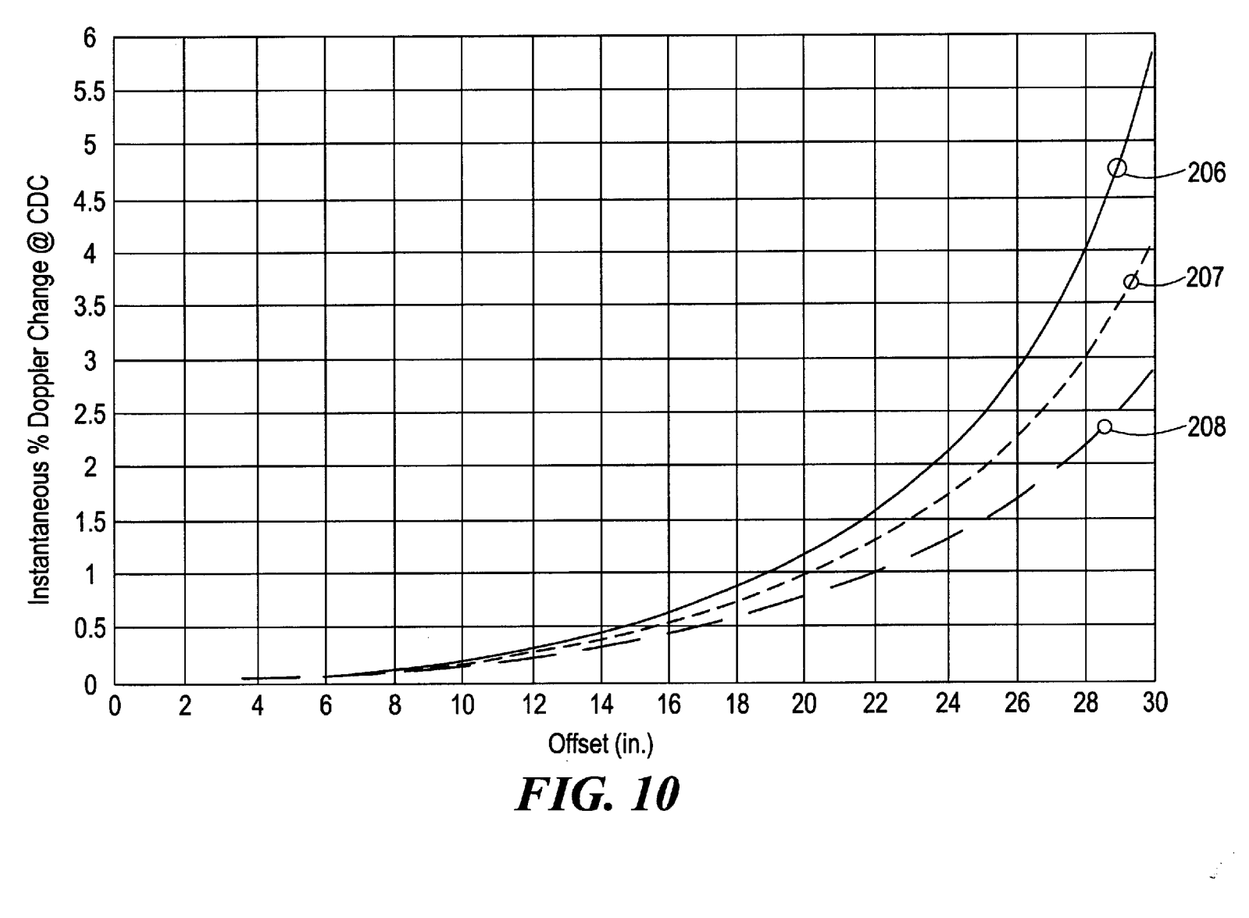
FIG. 10 is a graphic representation of the relationship between the instantaneous change of consecutive Doppler periods and the offset of a collision from the center of an automobile.

A graph showing curves which indicate the relationship between the Doppler period change and the offset is shown in FIG. 10. Curve 206 indicates the offset when an object is approaching at 90° to the bumper 144, FIG. 8, curve 207 indicates the offset when an object is approaching at 75°, and dashed curve 208 indicates the offset when an object is approaching at 60° to the bumper 144, FIG. 8. The purpose of differentiating between objects approaching in the range between 90° and 60° is discussed in detail below. Although the system is capable of monitoring objects approaching the bumper at angles less than 60°, since collisions which result from objects approaching at such angles are typically less severe, it is not essential for the system to track such objects. Therefore, the operation of the system at approach angles less than 60° will not be discussed. The following table, which shows the offset values which correspond to changes in the Doppler period of an object approaching the automobile at 90° to the bumper.

TABLE 1

| % Doppler Change @ Confirmation | Corresponding Offset (inches) |
| --- | --- |
| 0.01 | 1 |
| 0.05 | 4 |
| 0.1 | 6 |
| 0.2 | 9 |
| 0.25 | 10 |
| 0.5 | 14.5 |
| 0.75 | 16.5 |
| 1.0 | 19 |
| 1.5 | 21.5 |
| 2.0 | 23.5 |
| 3.0 | 26.5 |

Referring to the case illustrated by graph 200*b* in FIG. 8, if, for example, the Doppler period change between periods 204*a* and 204*b* is 1%, curve 206 shows that the offset of the object 140*b* from the sensor 16 is approximately 19".

Figure 9:
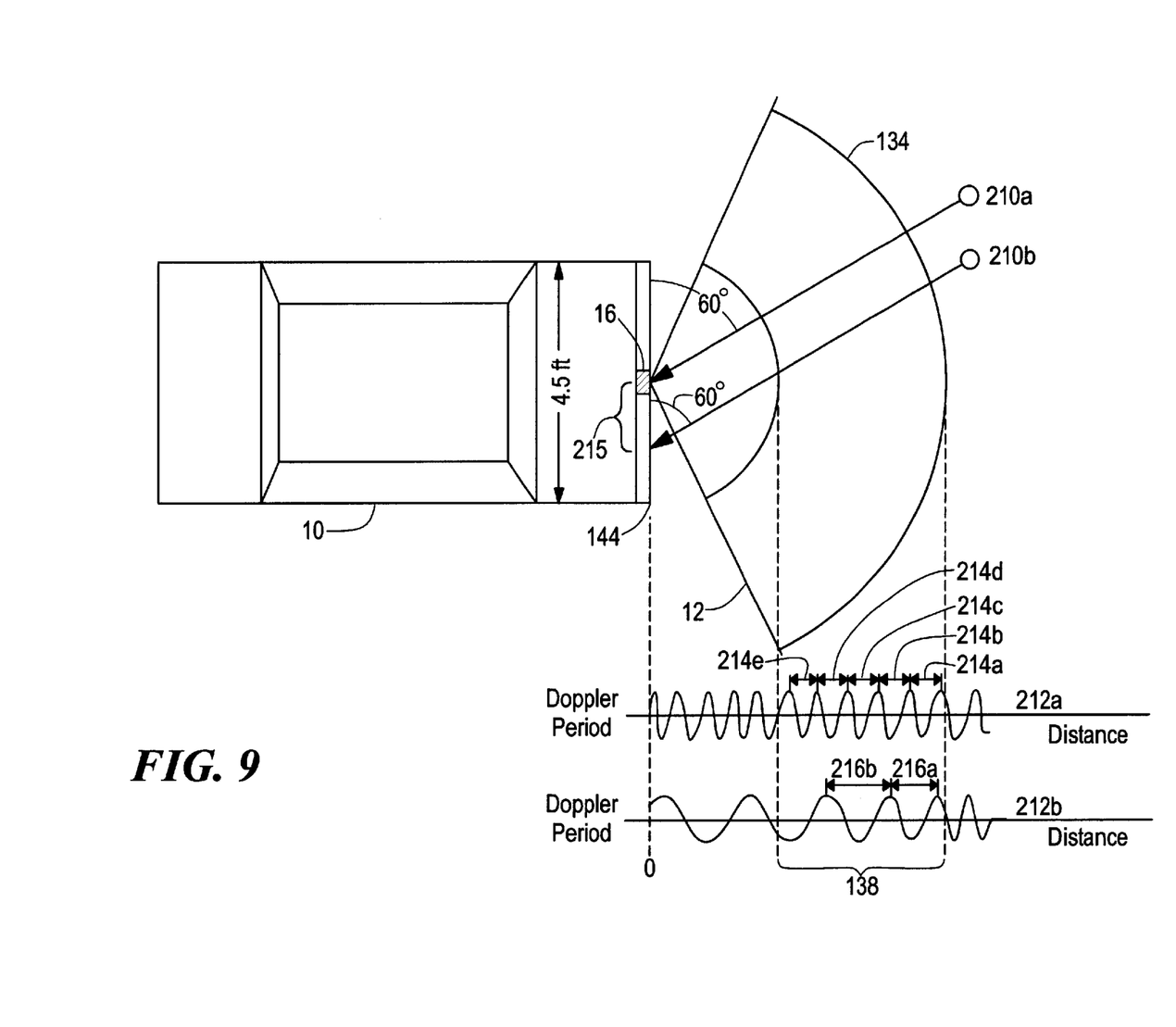
FIG. 9 is an illustration of an automobile on a collision course with two different objects approaching the automobile at 60° and a graph of the Doppler periods associated with each object.

FIG. 9 shows an object 210a approaching the center of the automobile 10 at an angle of 60° to the bumper 144. Graph 212a shows the Doppler period of the signal reflected by object 210a and received by sensor 16. As can be seen in FIG. 9, even though the object 210a is approaching the bumper at an angle of 60°, since it is travelling directly at the sensor 16, there is no change in the Doppler periods 214a–214c. Therefore, there is no offset from the sensor 16.

FIG. 9 also shows an object 210b approaching the bumper 144 at an angle of 60° to the bumper and offset from the sensor an amount indicated at 215. Graph 212b shows the Doppler period of the signal reflected by object 210b and received by sensor 16. As shown by graph 212b, the Doppler period increases as the object moves past sensor 16, as shown by periods 216a and 216b. Again, the change in the last two periods at the expiration of the confirmation distance 138 is used to determine the offset of the collision from the sensor 16.

Referring to FIG. 10, it can be seen that at a 1% Doppler period change, the offset is either 19" if the object is approaching at 90°, or it is 22" if the object is approaching at 60°. Since the sensor has no way of determining the angle at which the object is approaching the vehicle, this offset discrepancy represents the error associated with the system. Accordingly, at a Doppler change of 1%, as described above, the error is 3", depending on the approach angle of the object. At a Doppler change of 2.5% the error is approximately 4". It can therefore be seen that the greater the offset, the greater the potential error in the offset measurement. Accordingly, the amount of error depends on the amount of deviation from 90° of the approach angle of the object.

Figure 11:
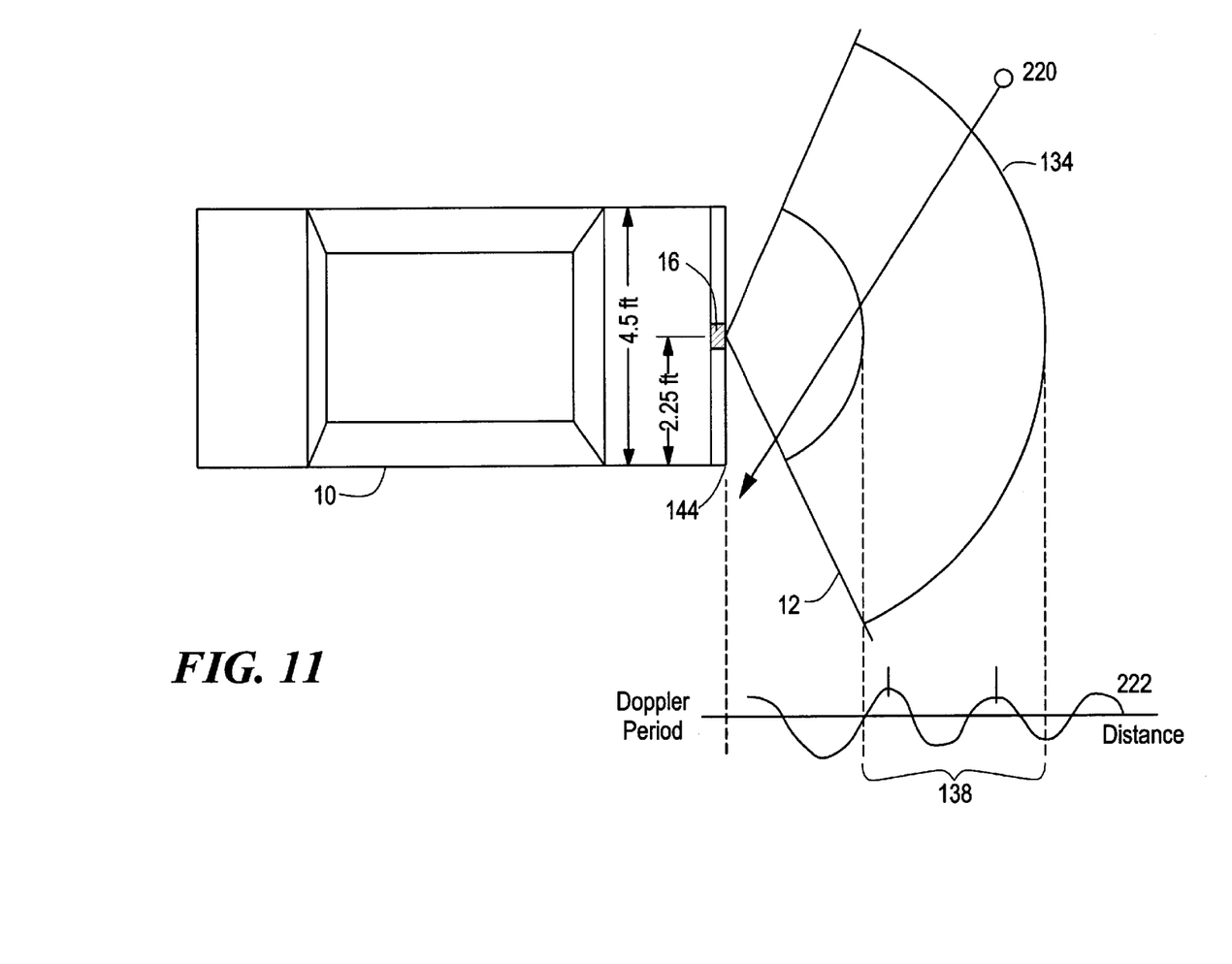
FIG. 11 illustrates an automobile on a potential collision course with an object and a graph of the Doppler period associated with the object.

FIG. 11 shows a situation in which an object 220 approaches the sensor 16 at such an angle that it does not collide with the automobile 10. Graph 222 shows the Doppler period of the signal reflected by the object 220 and received by the sensor 16. Although not shown to scale, after the crossing point 134, the Doppler period increases rapidly, as the object moves radially away from the sensor 16. As described above, the microprocessor monitors every period of the Doppler signal and compares it with the previous period to determine the change in consecutive periods. If the change is greater than a third threshold, as described with respect to block 118, FIG. 6, meaning that the amount of offset occurs beyond the periphery of the automobile, the microprocessor does not send a fire signal and returns to monitoring K2, block 110, FIG. 6. Preferably, the sensor 16 is located at the center of the bumper 144, in which case the third threshold indicates an offset of half the width of the vehicle 10. If the sensor 16 is not located at the center, the third threshold will depend on the distance between the sensor and the outside edges of the bumper.

For example, if the automobile 10 is 4.5 feet wide, meaning that the maximum offset is 27" from sensor 16, located at the center of the bumper 144, the third threshold will be set to indicate a change in the Doppler period which results in an offset which is beyond the periphery of the automobile and any potential error associated with the approach angle. In this case, the third threshold would be a Doppler period change of 3%, which would correlate to an offset of approximately 27" if the approach angle is 90°, and an offset of approximately 30" if the approach angle is 60°. If the microprocessor measures two consecutive Doppler periods which are different by 3% or more at any time during the confirmation distance 138, FIG. 11, the microprocessor determines that the object 220 will pass beyond the periphery of the automobile 10 and therefore no fire signal is sent to the decision device 20. The microprocessor then returns to monitoring K2, block 110, FIG. 6.

Figure 12:
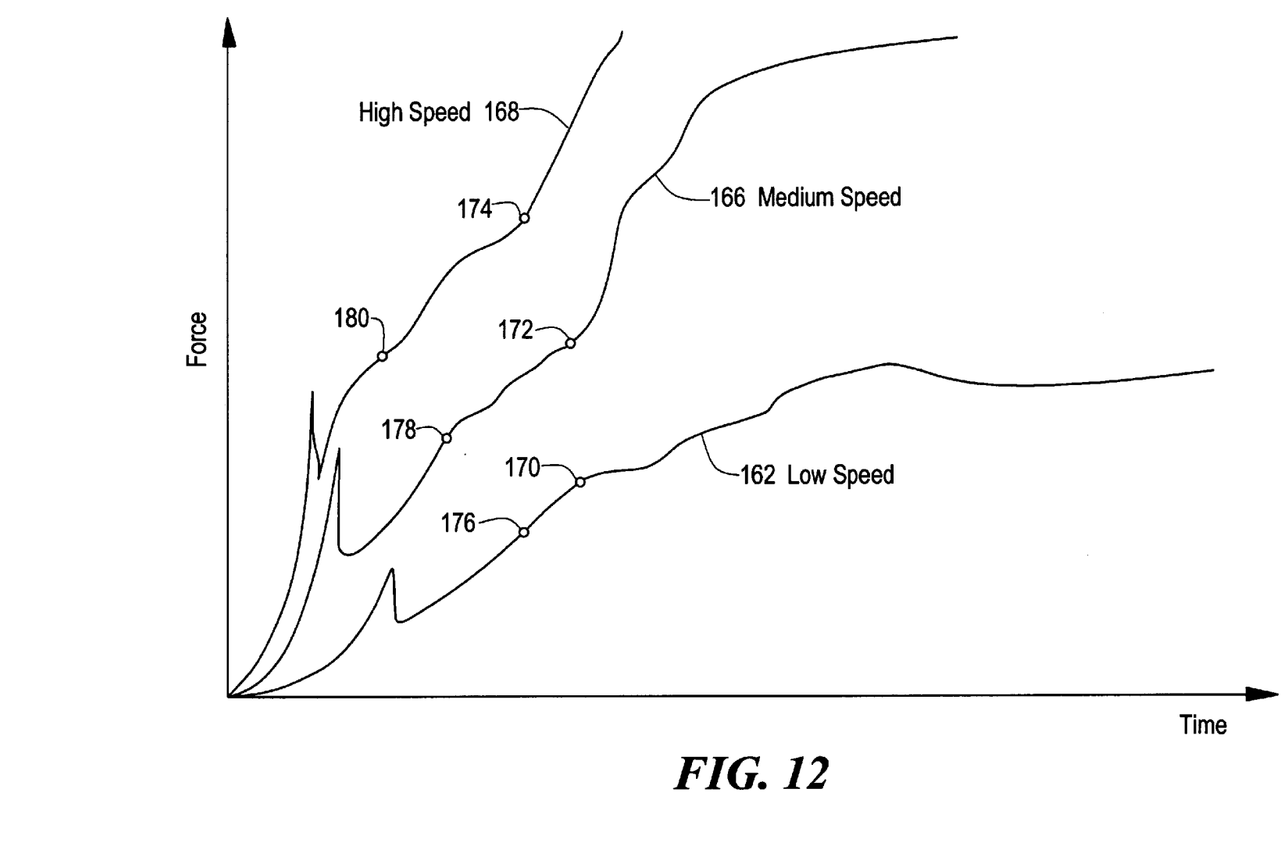
FIG. 12 is a graphic representation of g force sensor signals for low, medium and high speed collisions illustrating the various firing points of the passenger restraint system based on a detected relative velocity of the object compared to firing points based on an actual collision with the object.

A graphic representation of g force sensor signals for low speed 162, medium speed 166, and high speed 168 collisions based on empirical data of actual crashes can be seen in FIG. 12. Firing points 170, 172 and 174 correspond to typical points during a crash event at which the g sensor will send a fire signal to the passenger restraint system for low speed 162, medium speed 166, and high speed 168 collisions, respectively, based on the g forces the automobile is actually undergoing. In contrast, firing points 176, 178 and 180 represent the firing points for low speed 162, medium speed 166 and high speed 168 collisions as determined by the anticipatory collision sensor system according to this invention. For example, because a collision can be anticipated and determined to be imminent the passenger restraint system may fire at a point 176 which is much earlier in the crash event than the typical firing point 170 as determined by the g force sensor. In other words, whereas the g force sensor cannot determine the severity of the collision until a point in time 170 as a crash occurs, the anticipatory collision sensor system can determine the likelihood and location of the collision at a point in time 176 before the collision takes place. This reduces the time to fully deploy the airbag, thereby allowing full deployment of the airbag before the occupants have shifted position due to the collision. This allows the passenger to remain at a safer distance from the airbag as it inflates. This also permits variable inflation rates of the airbag, while allowing it to inflate sufficiently in time to restrain the occupants. It should be noted that firing points 176, 178 and 180 are based on the relative velocity of the object and the distance of the object and are not arbitrary firing points.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A wide angle, static, positional anticipatory object detection system comprising:

a transducer device for transmitting a modulated carrier signal and receiving the modulated carrier signal reflected from an object;

a detection device for detecting a plurality of Doppler shifted harmonic components from said reflected modulated carrier signal;

a range determining device responsive to the amplitudes of at least two of said harmonic components being equal for determining the instantaneous range of said object and, a predetermined distance thereafter, to a predetermined difference between the amplitudes of at least two of said harmonic components;

a Doppler period measurement device responsive to at least one of said harmonic components for measuring the Doppler periods of that harmonic component; and a collision decision device, responsive to said range determining device and said Doppler period measurement device, for indicating that a collision with said object is imminent and the offset of the collision from the detection device before contact is made.

2. The anticipatory object detection system of claim 1 wherein said collision decision device includes means for comparing consecutive Doppler periods of the harmonic component and determining the offset of the collision based on the difference of consecutive Doppler periods of said harmonic component.

3. The anticipatory object detection system of claim 2 further comprising a passenger restraint system for an automobile.

4. The anticipatory object detection system of claim 3, wherein an increase in the difference in consecutive Doppler periods indicates an increase in the offset.

5. The anticipatory object detection system of claim 2, wherein the amount of the offset increases in response to an increase in the difference of consecutive Doppler periods.

6. The anticipatory object detection system of claim 5, wherein said collision decision device includes means for determining if the difference exceeds an offset threshold value, in which case a collision will not occur.

7. The anticipatory object detection system of claim 6, wherein said threshold corresponds to an offset which occurs beyond a predetermined target width.

8. The anticipatory object detection system of claim 2 wherein said range determining device includes means for detecting when the amplitude of one of said harmonic components exceeds a predetermined threshold value.

9. The anticipatory object detection system of claim 8 wherein said range determining device further includes means for detecting when the difference in amplitude between said one of said harmonic components relative to the amplitude of another of said harmonic components exceeds a second threshold value.

10. The anticipatory object detection system of claim 9 wherein said range determining device further includes means for detecting when the amplitude of said one of said harmonic components is equal to the amplitude of said another of said harmonic components to determine the instantaneous range of said object.

11. The anticipatory object detection system of claim 10 wherein said collision decision device includes means for detecting when the difference of consecutive Doppler periods exceeds a third threshold value, in which case a collision with said object will not occur.

12. The anticipatory object detection system of claim 11 wherein said collision decision device further includes means for indicting that a collision is imminent and indicating the offset of the collision based on the difference of the last two consecutive periods which occur within said predetermined distance.

13. The anticipatory object detection system of claim 6 wherein said collision decision device further includes means for determining if a change in the value of one of said harmonic components exceeds a fourth threshold after said predetermined distance, thereby further confirming that a collision is imminent.

14. An anticipatory object detection system comprising:
a transducer device for transmitting a modulated carrier signal and receiving the modulated carrier signal reflected from an object;
a detection device for detecting a plurality of Doppler shifted harmonic components from said reflected modulated carrier signal;
a range determining device responsive to the amplitudes of at least two of said harmonic components being equal for determining the instantaneous range of said object and, a predetermined distance thereafter, to a predetermined difference between the amplitudes of at least two of said harmonic components;
a Doppler period measurement device responsive to the frequency of at least one of said harmonic components for measuring a change in consecutive Doppler periods of said harmonic components during said predetermined distance; and
a microprocessor responsive to said range determining device and said Doppler period measurement device for determining if a collision with said object is imminent and, if so, the position of said collision relative to said detection device.

15. A method for determining the probability and offset of a collision, the method comprising the steps of:
transmitting a modulated carrier signal;
receiving the modulated carrier signal after it is reflected from an object;
detecting a plurality of Doppler shifted harmonic components from the reflected modulated carrier signal;
determining the instantaneous range of the object based on the amplitudes of at least two of said harmonic components being equal;
measuring Doppler periods of one of said harmonic components;
determining differences between the Doppler periods of said harmonic component; and
indicating that a collision with the object is imminent and the offset of the collision based on said differences in the Doppler periods.

16. The method of claim 15, wherein the offset is determined by a difference in consecutive Doppler periods.

17. The method of claim 16, further comprising the step of determining if a difference in consecutive Doppler periods exceeds a threshold, in which case a collision is not imminent.

18. The method of claim 16 wherein said threshold indicates an offset which is beyond the periphery of the object.

* * * * *